(12) United States Patent
Beach et al.

(10) Patent No.: US 7,616,716 B2
(45) Date of Patent: Nov. 10, 2009

(54) SYNCHRONISATION IN A RECEIVER

(75) Inventors: Mark Anthony Beach, Bristol (GB); Christopher Williams, Bristol (GB)

(73) Assignee: University of Bristol, Bristol (GB)

( * ) Notice: Subject to any disclaimer, the term of this patent is extended or adjusted under 35 U.S.C. 154(b) by 707 days.

(21) Appl. No.: 11/218,314

(22) Filed: Aug. 31, 2005

(65) Prior Publication Data
US 2006/0050801 A1 Mar. 9, 2006

(30) Foreign Application Priority Data
Sep. 1, 2004 (GB) ................... 0419399.1

(51) Int. Cl.
H04L 27/14 (2006.01)
(52) U.S. Cl. ...................... 375/343; 375/260
(58) Field of Classification Search .............. 375/260, 375/354, 355
See application file for complete search history.

(56) References Cited
U.S. PATENT DOCUMENTS
2006/0018413 A1* 1/2006 Gupta ................... 375/343

FOREIGN PATENT DOCUMENTS
| EP | 0730357 | 9/1996 |
| EP | 0896457 | 2/1999 |
| EP | 1071251 | 1/2001 |
| EP | 1089500 | 4/2001 |
| EP | 1089510 | 4/2001 |
| EP | 1296493 | 3/2003 |
| GB | 2 353 680 | 2/2001 |
| GB | 2 373 692 | 9/2002 |
| GB | 2 396 085 | 9/2004 |

OTHER PUBLICATIONS

EPO Search Report for Int'l Application No. EP05255310, dated Jan. 24, 2006, 6 pages.
GB Examination Report for Int'l Application No. GB0419399.1, dated Jun. 25, 2008.
Van de Beek et al., "ML Estimation of Time and Frequency Offset in OFDM Sytems," IEEE Transactions on Signal Processing, vol. 45, No. 7, Jul. 1997, pp. 1800-1805.

* cited by examiner

*Primary Examiner*—Shuwang Liu
*Assistant Examiner*—David Huang
(74) *Attorney, Agent, or Firm*—Weaver Austin Villeneuve & Sampson LLP

(57) ABSTRACT

A radio receiver is suitable for use in an OFDM wireless communications system, in which it is necessary to identify a timing point at a start of a frame. In order to ensure optimum performance of the receiver in multipath environments, it should be synchronised with the first received multipath component, although one or more of the delayed multipath components may be stronger than the first component. A method of determining the time position of the first received multipath component, determines a correlator function from the received signal, and determines the required timing point from a falling edge in a derivative of the correlator function.

16 Claims, 4 Drawing Sheets

SYNCHRONISATION IN A RECEIVER

This invention relates to a receiver, and in particular to a receiver which is adapted to receive signals transmitted in an Orthogonal Frequency Division Modulation (OFDM) system, with signals being transmitted in frames, and with each frame including a cyclic prefix. More particularly, the invention relates to a method of achieving synchronisation in such a receiver.

OFDM data transmission systems are well known to the person skilled in the art, for example from broadcast digital television systems, and wireless local area networks according to IEEE 802.11a, amongst others.

In such OFDM transmission systems, the transmitted signal is divided into frames, and a part of the data to be transmitted in each frame is added to the beginning of that frame as a cyclic prefix. For example, in the case of an OFDM symbol which is N samples long, the last L samples of the symbol can be appended as a preamble in order to form the complete transmitted symbol of length N+L samples.

In order to correctly decode the received signals, it is necessary to synchronise the receiver, by identifying a timing point at the beginning of each transmitted symbol, when it is received at the receiver. Further, it is known that this timing point can be determined by examining a correlation between the received samples and a delayed version of the received samples, with the delay being equal to the number of useful samples in a symbol, since this identifies the correlation between the preamble and the last L samples of the symbol.

In favourable transmission conditions, this correlation function reaches a maximum when the preamble is being correlated with the last L samples of the symbol, and so it can be used to deduce the position of the start of the symbol. The document 'ML Estimation of Time and Frequency Offset in OFDM Systems', van de Beek, et al. IEEE Transactions on Signal Processing, vol. 45, no. 7. July 1997, discloses one such technique for achieving synchronisation in the receiver by examining the magnitude of the correlation function.

However, such techniques have the disadvantage that they perform relatively poorly in multipath environments, that is in transmission environments in which a receiver receives multiple transmissions of each symbol, either because of echoes, or in a situation in which there are multiple transmitters transmitting the signals, in order to ensure that data can be received over a wide area.

In order to ensure optimum performance of the receiver, it should be synchronized with the first received multipath component. However, one or more of the delayed multipath components may be stronger than the first component, and may be detected as a false timing point by conventional techniques.

According to the present invention, there is provided a method for achieving synchronisation in the receiver, and in particular of determining the time position of the first received component.

More particularly, according to a preferred embodiment of the invention, there is provided a method of determining the time position of the first received multipath component, by detecting a falling edge in a derivative of a correlator function.

According to another aspect of the present invention, there is provided a receiver operating in accordance with this method.

For a better understanding of the present invention, reference will now be made, by way of example, to the accompanying drawings, in which:—

Figure 1:
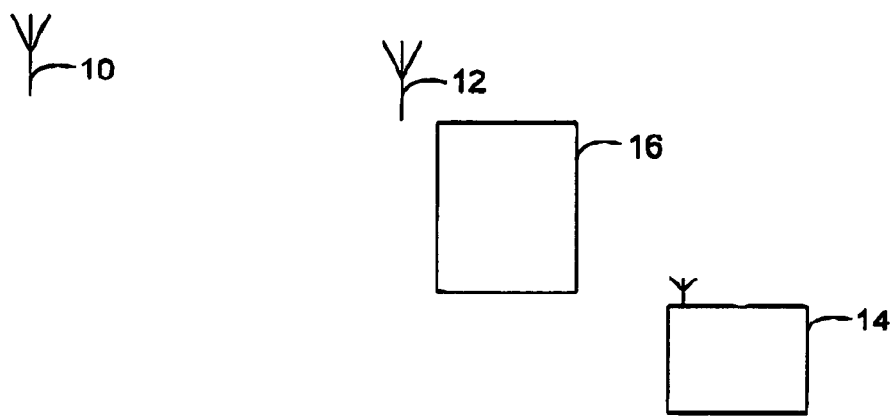
FIG. 1 is a schematic representation of a part of an OFDM communications system.

FIG. 1 shows, for the purposes of illustration, a simplified representation of a part of an OFDM communications system. More particularly, FIG. 1 shows two transmitters 10, 12, forming part of a network of such transmitters, with each transmitter transmitting the same signals on the same transmission frequency. This arrangement has the advantage that a receiver 14, which may be mobile, can receive the transmitted signals over a wide coverage area, without needing to retune. However, this arrangement does have the property that the receiver 14 will typically be able to detect signals from more than one of the transmitters. Moreover, in the situation shown in FIG. 1, although the receiver 14 is nearer to the second transmitter 12 than to the first transmitter 10, meaning that the signal from the second transmitter 12 is received by the receiver 14 slightly before the signal transmitted from the first transmitter 10, the signal transmitted from the second transmitter 12 is at least partially blocked by a tall building 16, which means that the signal transmitted by the second transmitter 12 is received at the receiver 14 with a lower amplitude than the signal transmitted by the first transmitter 10.

Although the invention is described with reference to a single frequency network of this type, it is also applicable to any receiver which may be operated in a multipath environment. That is, although a signal may be transmitted to a receiver from a single transmitter, the receiver may receive multiple copies of the signal at slightly different times, because of echoes.

As is conventional, in this OFDM communication system, the transmitted signal is divided into frames. More specifically, the data is divided into OFDM symbols which are N samples long, and the last L samples of the symbol are appended as a preamble, or cyclic prefix, in order to form the complete transmitted symbol of length N+L samples.

Figure 2:
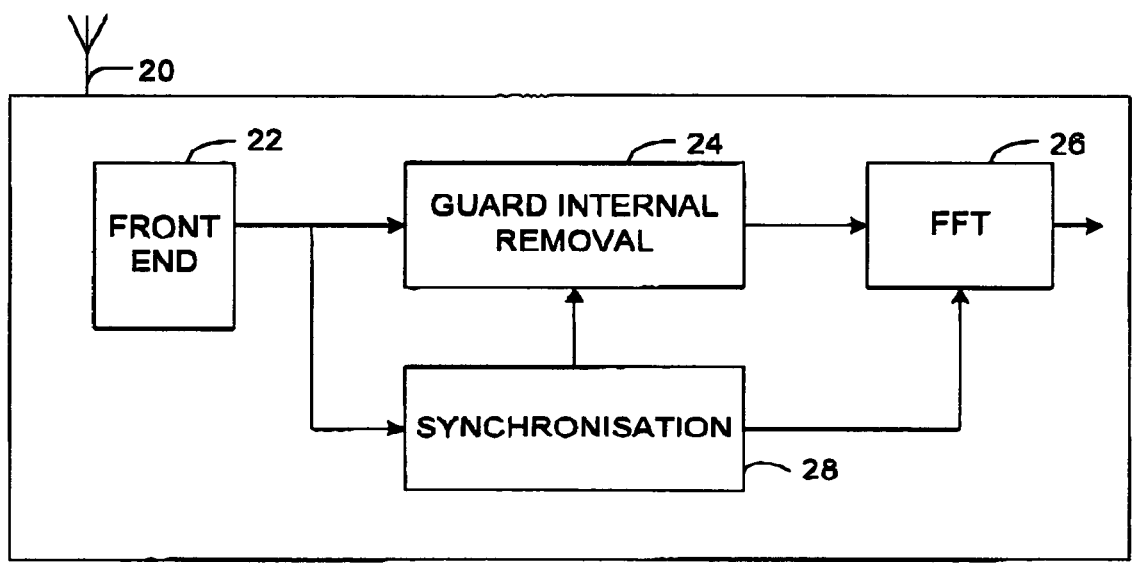
FIG. 2 is a block schematic diagram of a receiver in accordance with an aspect of the present invention.

FIG. 2 shows in more detail the form of the receiver 14. Specifically, signals received at an antenna 20 are passed to a receiver front-end circuit 22, in which, for example, they are frequency converted and converted to digital form. The resulting samples are passed to a guard interval removal block 24, in which the samples constituting the cyclic prefix are removed, with the remaining samples being passed to a Fast Fourier Transform block 26. The output from the FFT block 26 is then passed to further signal processing blocks, which are not shown in FIG. 2.

The digital samples output from the receiver front end block 22 are also passed to a synchronisation block 28, which determines the time position of the start of each received frame, and the guard interval removal block 24 operates on the basis of this synchronisation output. A correct determination of this time position is required in order to ensure that the FFT block 26 operates correctly.

As will be appreciated by the person skilled in the art, the receiver 14 as shown in FIG. 2 is generally conventional, and so the other features and functions of the receiver will not be described in further detail.

However, the synchronisation block 28 will be described in further detail below, with reference to FIG. 3.

Figure 3:
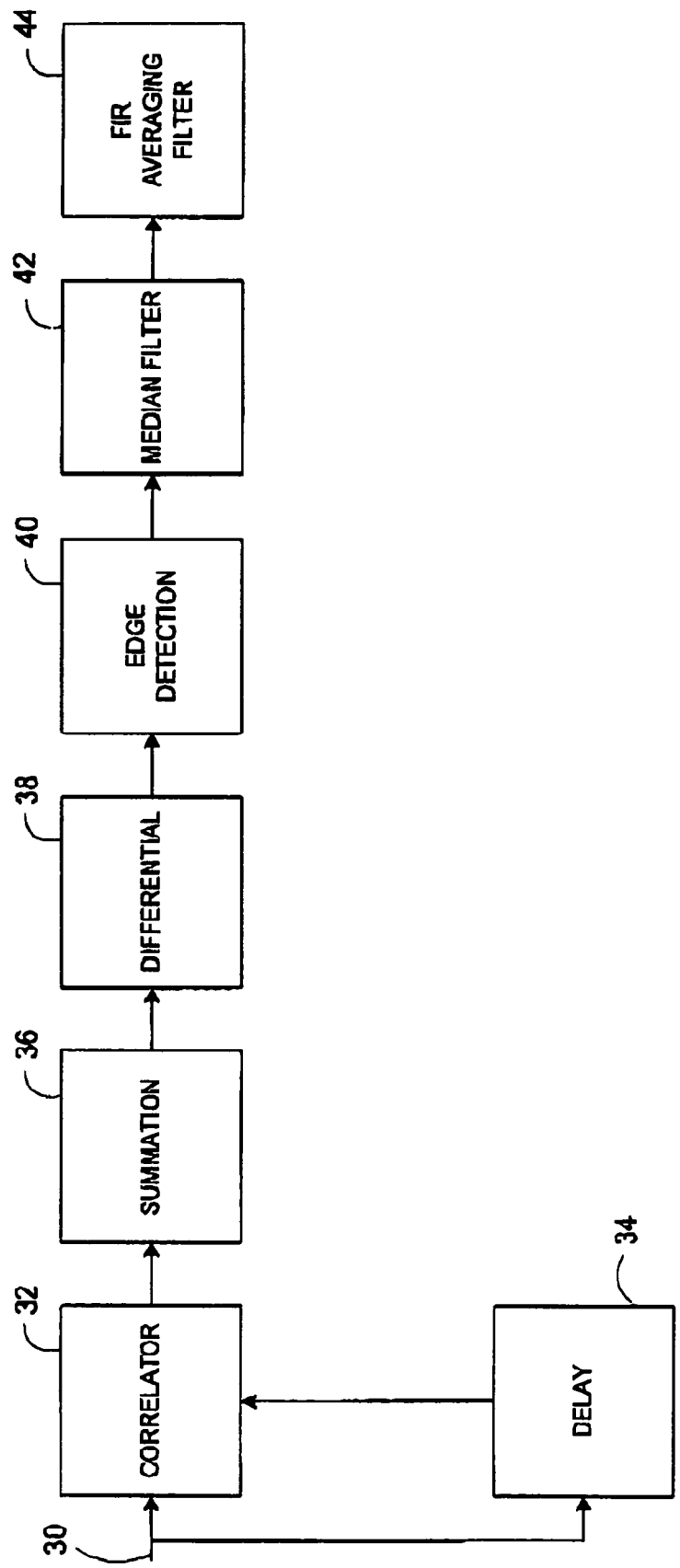
FIG. 3 is a more detailed block schematic diagram of a part of the receiver of FIG. 2.

As shown in FIG. 3, the digital samples output from the receiver front end block 22 are received on an input line 30 of the synchronisation block 28. These received samples are passed to a first input of a correlator 32, and are simultaneously passed to a delay block 34. The delay block 34 delays the received samples by a time period which is equivalent to the length of the useful symbol period (N). The delayed samples are then passed to a second input of the correlator 32.

The correlator 32 forms the conjugate product of the samples received on its two inputs. That is, for received samples x and y, the correlator 32 forms the product x.y*, where the notation "y*" indicates the complex conjugate of y. The output correlation values are then passed to a summation block 36, which forms the sum of these correlation values over a number of samples which is equivalent to the length of the cyclic prefix. Apart from a scaling factor, this is equivalent to the average correlation value.

This produces a correlation function which, in a channel with no multipath transmission, reaches a peak at the time position indicating the start time of a received frame, since this corresponds to the time when the last L samples of the symbol are being correlated with the cyclic prefix. In the case where a receiver is receiving transmissions from only one transmitter, detection of this peak allows synchronization to be performed. However, in the case where the receiver is receiving signals from two or more transmitters, or is otherwise receiving two or more multipath components of the transmitted signal, detecting the peak in the correlation function is not sufficient.

Figure 4:
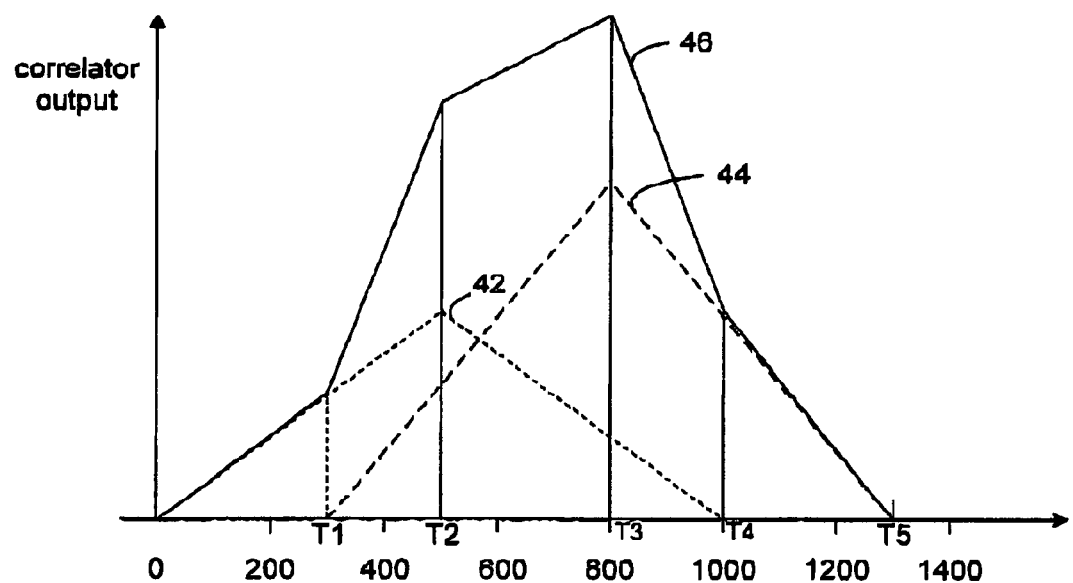
FIG. 4 is an illustrative representation of a signal obtained at a first point in the receiver of FIG. 3.

FIG. 4 shows the value of the correlation function (MLE), obtained at the output of the averaging block 36, over time, in the case where the receiver is receiving signals from two transmitters. Specifically, FIG. 4 shows the value of the correlation function for a range of starting samples.

As can be seen in FIG. 4, the overall output correlation function is made up of a first component 42, which results from the reception of signals transmitted from one transmitter (for example the second transmitter 12 shown in FIG. 1) and a second component 44 resulting from the reception of signals transmitted by another transmitter (for example the first transmitter 10 shown in FIG. 1).

The first component 42 starts at the time 0, reaches a peak at the time position T2, which corresponds to the time at which the first sample of a new frame is received from the second transmitter 12, and falls back to 0 at the time position T4. The second component 44 starts at the time T1, reaches a peak at the time position T3, corresponding to the time at which the receiver 14 receives the first sample of a new frame from the first transmitter 10, and falls back to 0 at the time position T5. As explained above with reference to FIG. 1, the signal from the second transmitter 12 is received before the signal from the first transmitter 10, but with a lower amplitude, and so the first component reaches its peak value earlier than the second component, but it reaches a lower peak value.

The overall correlation function 46 is output from the summation block 36. As can be seen from FIG. 4, this overall correlation function 46 increases during the period up to T1, then increases at a higher rate between T1 and T2, then increases between T2 and T3 at a rate which is again lower than the rate between T1 and T2. Between time positions T3 and T4, the overall correlation function 46 decreases, and it decreases at a lower rate between T4 and T5.

Thus, the overall correlation function 46 reaches a peak at the time position T3. Although this time position can easily be determined by examining the output of the summation block 36, this time position is of limited value when attempting to achieve synchronisation of the receiver. Rather, the ideal timing position is T2, the time position at which the first component 42 reaches it peak.

In order to allow this time position to be determined accurately, the correlation function output from the summation block 36 is passed to a differentiator 38, which detects the slope of the output correlation function 46.

Figure 5:
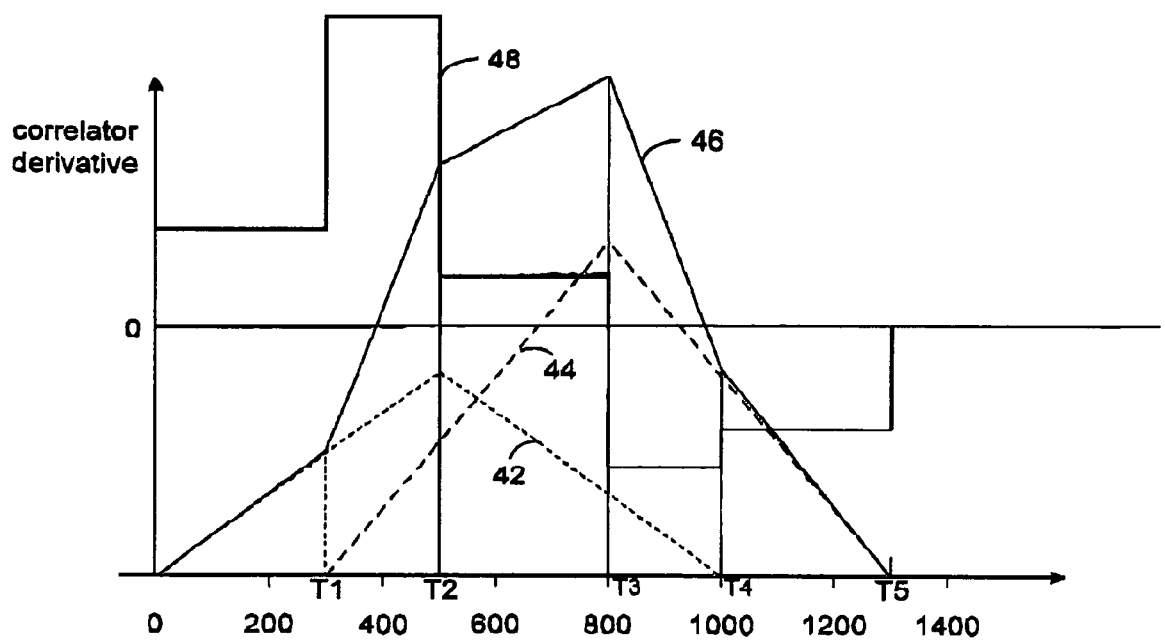
FIG. 5 is an illustrative representation of a signal obtained at a second point in the receiver of FIG. 3.

As can be seen in FIG. 5, which corresponds to FIG. 4 but with the derivative 48 of the output correlation function 46 added, the derivative 48 is positive up to time T1 then has a higher positive value between times T1 and T2, then is lower but still positive between times T2 and T3, while the first component 42 is decreasing but the second component 44 is still increasing. Between times T3 and T4, when the first and second components 42, 44 are both decreasing, the derivative 48 becomes negative, and between times T4 and T5 the derivative takes a smaller negative value.

According to the present invention, the synchronisation block 28 detects the time position at which the derivative 48 has its first falling edge, since this is the time position which corresponds to the time position T2 at which the first component reaches its peak value.

Figure 6:
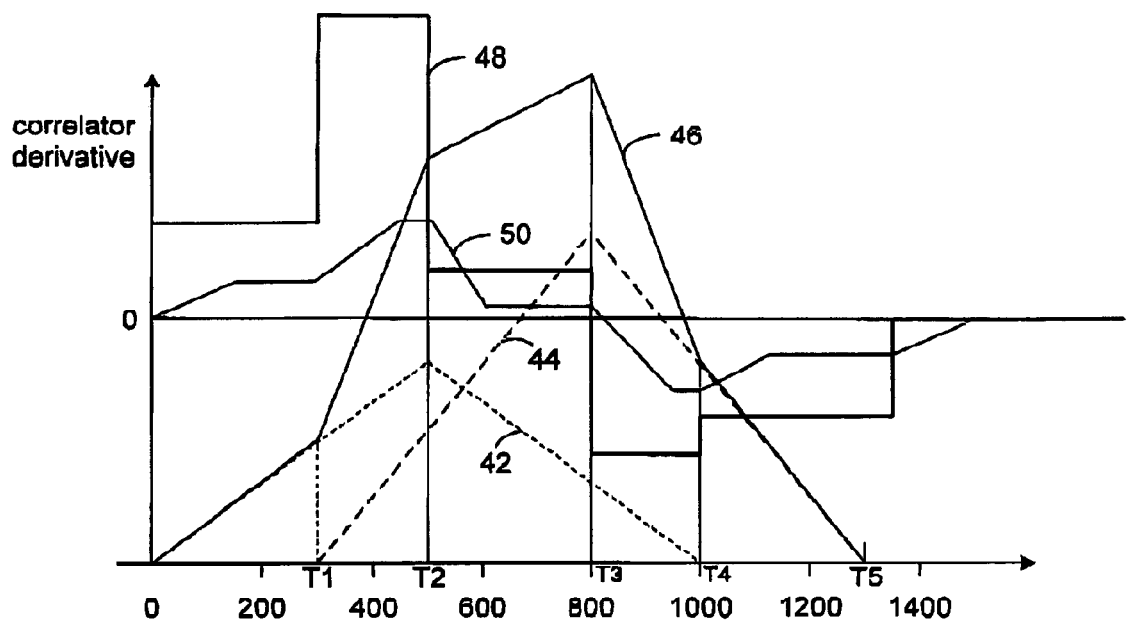
FIG. 6 is an illustrative representation of a signal obtained at a third point in the receiver of FIG. 3.

In this preferred embodiment of the invention, this time position is detected by passing the derivative function 48, output from the differentiator 38, to an edge detector 40. The edge detector 40 operates by low pass filtering the derivative function 48. FIG. 6 corresponds to FIG. 5 but with the low-pass filtered version 50 of the derivative function 48 added.

Figure 7:
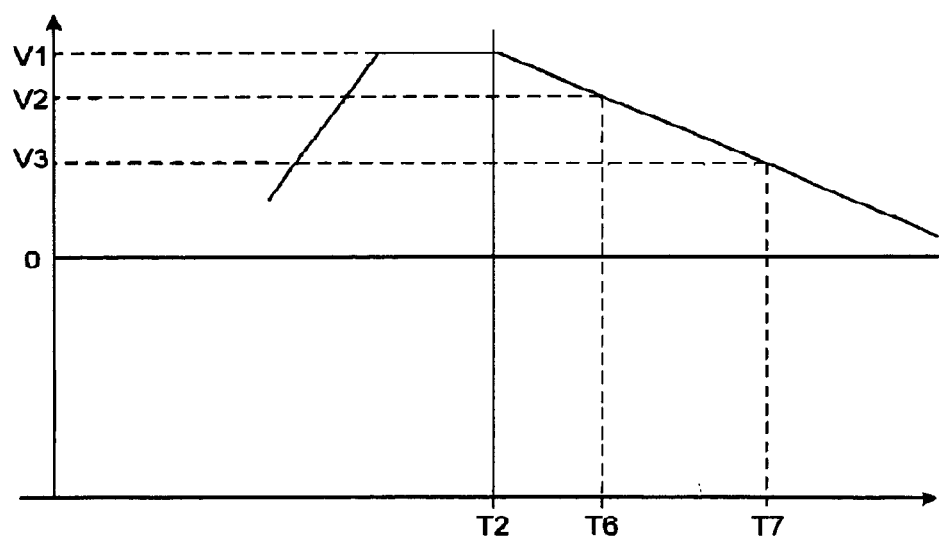

FIG. 7 is an expanded diagram, showing a part of FIG. 6 to a larger scale. More specifically. FIG. 7 shows the value of the low-pass filtered version 60 of the derivative function 48, in the region of the time position T2. During the time period immediately before the time position T2, the low-pass filtered version 50 of the derivative function 48 has the value V1. At time T2, this value starts to decrease, reaching the value V2 by the time position T6 and V3 by the time position T7. The exact value of the time position T2 can then be determined algebraically, by using a value for the slope of the function derived from these values. More specifically, the time position T2 can be calculated as:

$$T2 = T7 - \frac{(T7 - T6)(V1 - V3)}{(V2 - V3)}$$

The time positions T6 and T7 can be chosen arbitrarily, provided that they are spaced sufficiently far apart to allow accurate calculation of the value for T2, and provided that they are chosen while the value of the low-pass filtered function 50 is still decreasing after T2.

The edge detection block 40 therefore provides a synchronisation output, which indicates the peak in the first component 42 of the correlation function 46, and therefore can be used to identify this ideal timing point.

As described so far, the system provides a synchronisation output for each received symbol. However, the synchronization output provided by the edge detection block 40 can vary substantially from symbol to symbol. In particular, some of the values of the synchronisation output can contain large errors, although such errors occur relatively infrequently. The output from the edge detection block 40 is therefore passed to a median filter 42 and then to a FIR averaging filter 44. The median filter 42 receives a series of successive values of the synchronisation output. The number of successive values in the series can be relatively small, for example five. The median filter then discards the highest and lowest values in the series, taking the median value of the series as its output, so that any spurious values are removed. The FIR averaging filter 44 then forms the mean of the values which it receives from the median filter 42. This filtering reduces the variation in the output values.

This synchronisation output from the synchronisation block 28 can then be used in the guard interval removal block 24 and in the FFT block 26. Since these uses of the synchronization output are conventional, they will not be described further herein.

Although FIG. 3 shows the various functions of the synchronisation block 28 as discrete blocks, it will be appreciated that these functions can be carried out in hardware or in software as desired, and can be performed in separate blocks or in a single device.

The invention has been described herein with reference to an OFDM communications 36 system, in which a correlation is detected between two identical segments in a received frame. However, the same technique is applicable to other communications systems that rely on detecting a correlation, including for example GPS and other location systems. In the case of a GPS system, a receiver receives a signal from an orbiting satellite, the signal including a code which identifies the satellite. The receiver must determine the time position at which the code is received. This is achieved by correlating the received signal with the codes used by the different orbiting satellites, and obtaining a synchronisation signal by detecting the time position at which one of the stored codes correlates with the received code. As in the OFDM case described above, in a multipath environment, the receiver may receive one or more echoes of the signal, and it is necessary to detect the first received multipath component in order to be able to determine accurately the position of the receiver.

The technique described above can therefore be used to detect the time position corresponding to the peak of the component of the correlation unction corresponding to the first received multipath component.

There is therefore provided a method of detecting a correlation, and a receiver which uses the method.

The invention claimed is:

1. A method of detecting a time of receipt of a received radio signal, the received radio signal including at least one multipath component of a transmitted signal, the method comprising:
   determining a correlation function corresponding to a value of a correlation between the received radio signal and a correlation signal;
   forming a derivative of the correlation function;
   low pass filtering the derivative of the correlation function;
   detecting a falling edge of the derivative of the correlation function by determining a time position at which the low pass filtered derivative of the correlation function starts to fall; and
   detecting the time of receipt of the received radio signal on the basis of a time position of said falling edge.

2. A method as claimed in claim 1, wherein the correlation signal comprises a delayed version of the received radio signal.

3. A method as claimed in claim 2, wherein the transmitted signal comprises a useful symbol plus a last part of said useful symbol transmitted as a cyclic prefix, and wherein the correlation signal comprises the received radio signal delayed by a useful symbol length.

4. A method as claimed in claim 1, wherein the correlation signal comprises a stored signal, comprising a code contained in the transmitted signal.

5. A method as claimed in claim 4, comprising determining a plurality of correlation functions, each corresponding to a value of a correlation between the received radio signal and one of a plurality of stored signals, each of the stored signals comprising a respective code contained in transmitted signals from respective transmitters.

6. A method as claimed in claim 1, comprising determining the time position at which the low pass filtered derivative of the correlation function staffs to fall by extrapolating back from at least two positions on the low pass filtered derivative of the correlation function to a peak value of said function.

7. A method as claimed in any preceding claim, comprising:
   detecting the falling edge of the derivative of the correlation function for a plurality of frames of the received radio signal;
   median filtering the detected positions of the falling edges in said frames; and
   detecting the time of receipt of the received radio signal on the basis of the median filtered time-positions of said falling edges.

8. A radio receiver, for detecting a time of receipt of a received radio signal, the received radio signal including at least one multipath component of a transmitted signal, wherein the radio receiver comprises:
   a processor, for determining a correlation function corresponding to a value of a correlation between the received radio signal and a correlation signal and for detecting the time of receipt of the received radio signal on the basis of a time position of a falling edge of a derivative of the correlation function; and
   a filter, for low pass filtering the derivative of the correlation function,
   wherein the processor is adapted for detecting the falling edge of the derivative of the correlation function by determining a time position at which the low pass filtered derivative of the correlation function starts to fall.

9. A radio receiver as claimed in claim 8, wherein the correlation signal comprises a delayed version of the received radio signal.

10. A radio receiver as claimed in claim 9, wherein the transmitted radio signal comprises a useful symbol plus a last part of said useful symbol transmitted as a cyclic prefix, and wherein the correlation signal comprises the received radio signal delayed by a useful symbol length.

11. A radio receiver as claimed in claim 10, wherein the radio receiver is an OFDM receiver.

12. A radio receiver as claimed in claim 8, wherein the correlation signal comprises a stored signal, comprising a code contained in the transmitted signal.

13. A radio receiver as claimed in claim 12, wherein the radio receiver is a GPS receiver.

14. A radio receiver as claimed in claim 12, wherein the processor is adapted for determining a plurality of correlation functions, each corresponding to a value of a correlation between the received radio signal and one of a plurality of stored signals, each of the stored signals comprising a respective code contained in transmitted signals from respective transmitters.

15. A radio receiver as claimed in claim 8, wherein the processor is adapted for determining the time position at which the low pass filtered derivative of the correlation function staffs to fall by extrapolating back from at least two positions on the low pass filtered derivative of the correlation function to a peak value of said function.

16. A radio receiver as claimed in one of claims 10-15, wherein the processor is adapted for:

detecting the falling edge of the derivative of the correlation function for a plurality of frames of the received radio signal;

median filtering the detected positions of the falling edges in said frames; and detecting the time of receipt of the received radio signal on the basis of the median filtered time positions of said falling edges.

* * * * *

UNITED STATES PATENT AND TRADEMARK OFFICE
CERTIFICATE OF CORRECTION

PATENT NO. : 7,616,716 B2  Page 1 of 1
APPLICATION NO. : 11/218314
DATED : November 10, 2009
INVENTOR(S) : Beach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Nineteenth Day of October, 2010

David J. Kappos
*Director of the United States Patent and Trademark Office*